United States Patent [19]

Shio

[11] 4,010,330
[45] Mar. 1, 1977

[54] AUTOMATIC TELEPHONE DIALER

[76] Inventor: Cheng Shio, 145-34 34th Ave., Flushing, N.Y. 11354

[22] Filed: Aug. 11, 1975

[21] Appl. No.: 603,748

[52] U.S. Cl. .............................................. 179/90 B
[51] Int. Cl.² ......................................... H04M 1/45
[58] Field of Search ........ 179/90 AD, 90 B, 90 BD, 179/90 R, 5 P, 5 R

[56] References Cited

UNITED STATES PATENTS

| | | | |
|---|---|---|---|
| 2,579,983 | 12/1951 | Thornton | 179/90 AD |
| 2,949,508 | 8/1960 | Rettie et al. | 179/90 AD |
| 2,966,557 | 12/1960 | Schmitt | 179/90 AD |
| 3,705,960 | 12/1972 | Evans et al. | 179/90 B |
| 3,836,729 | 9/1974 | Wodenka | 179/90 B |
| 3,903,376 | 9/1975 | Nishikiori | 179/90 AD |

FOREIGN PATENTS OR APPLICATIONS 674,357  6/1952  United Kingdom .......... 179/90 AD

*Primary Examiner*—Kathleen H. Claffy
*Assistant Examiner*—Gerald L. Brigance
*Attorney, Agent, or Firm*—Peter L. Berger

[57] ABSTRACT

An automatic telephone dialer is disclosed for operation with both a rotary type and push button conventional telephone. The automatic dialer enables regular conventional dialing procedures to be employed with the automatic dialer in place without interfering with normal telephone operation, and further, can be installed without interfering with, touching or in any way altering the telephone company's lines or equipment. Any desired number can be arranged to be automatically dialed and an indexing device is utilized so that when a specifically sought number is to be dialed, the index pointer is moved to that location, and the telephone number is automatically dialed.

8 Claims, 18 Drawing Figures

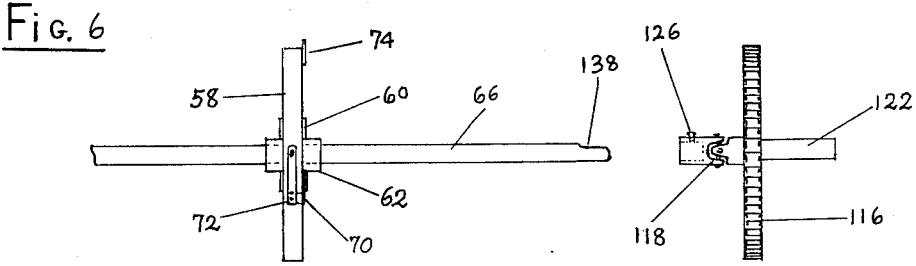
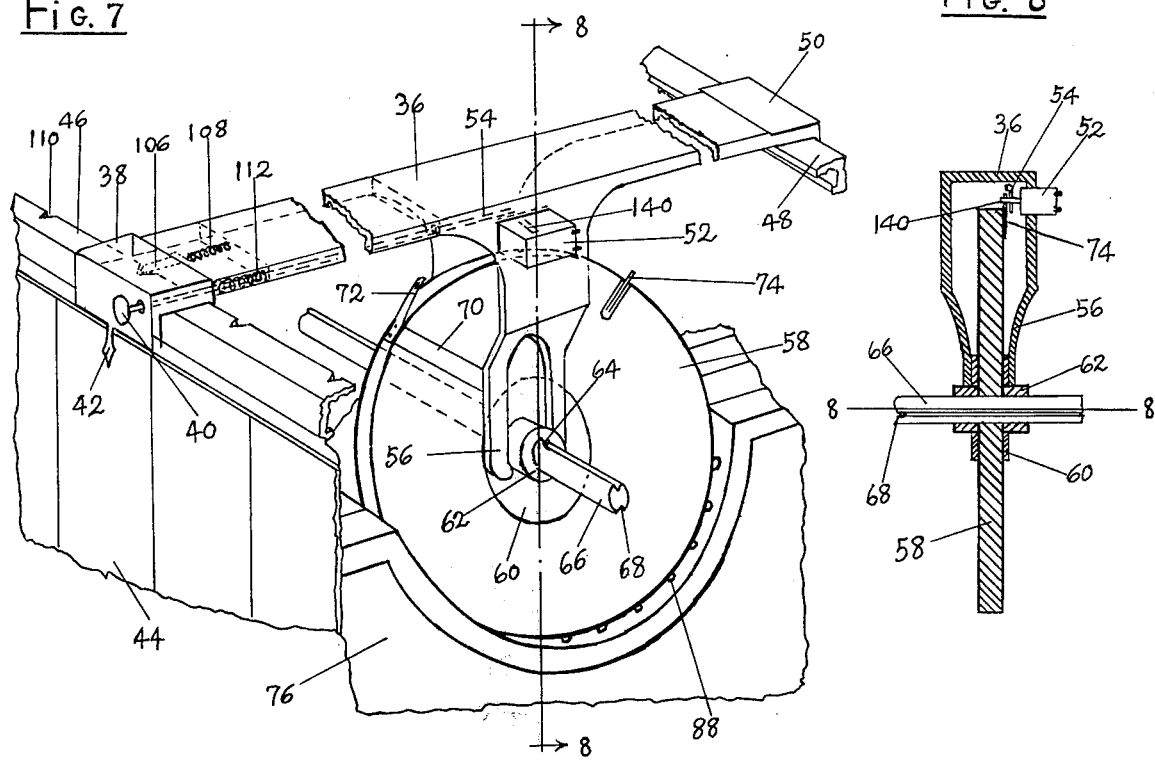
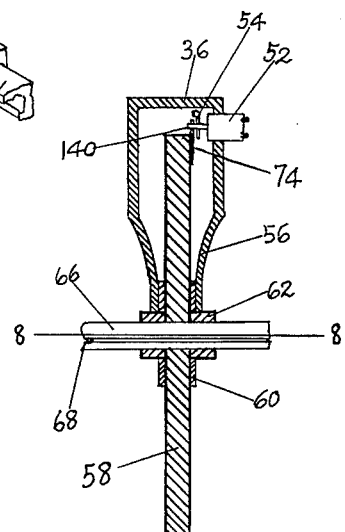
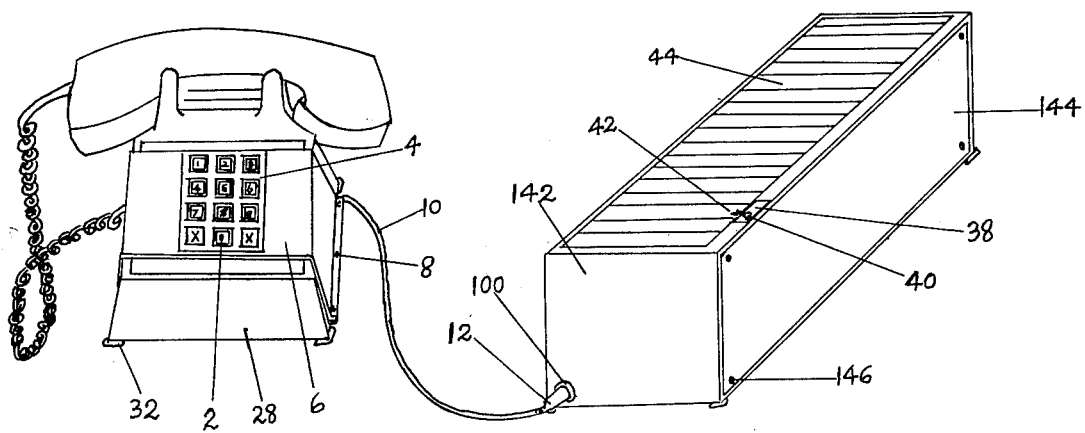

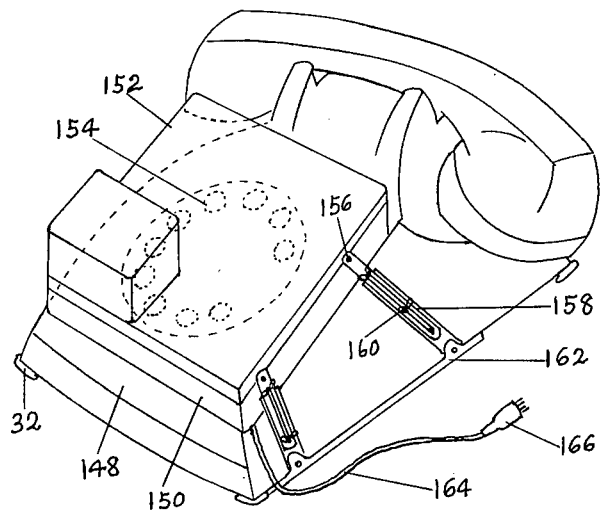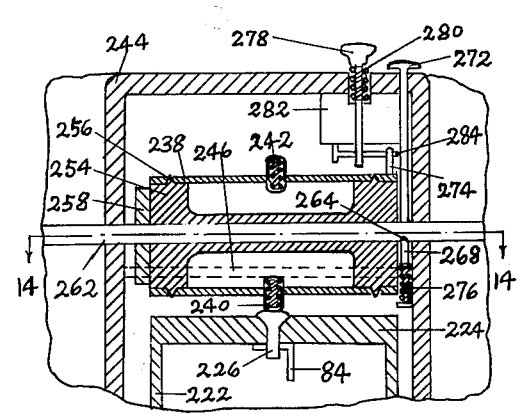

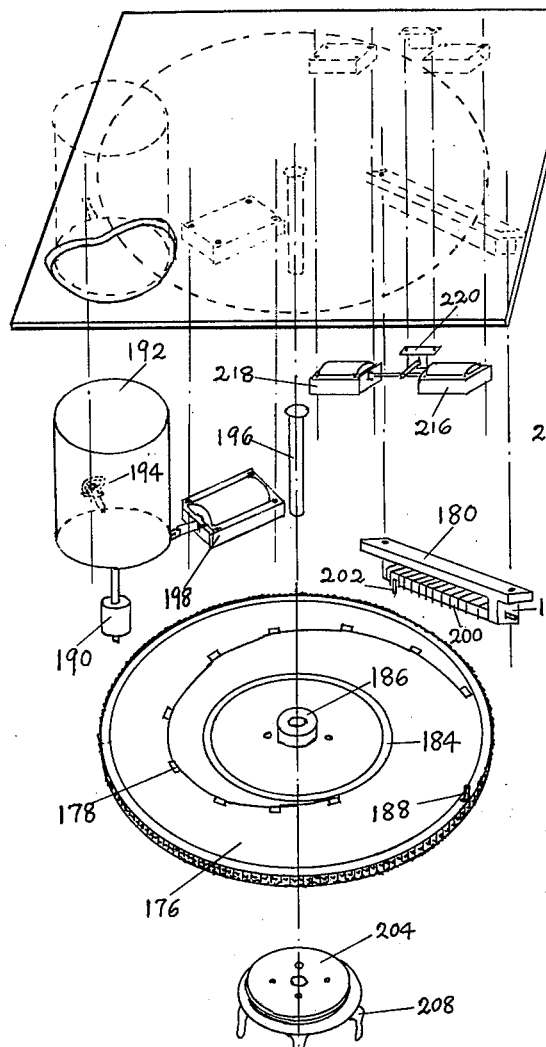
Fig. 13
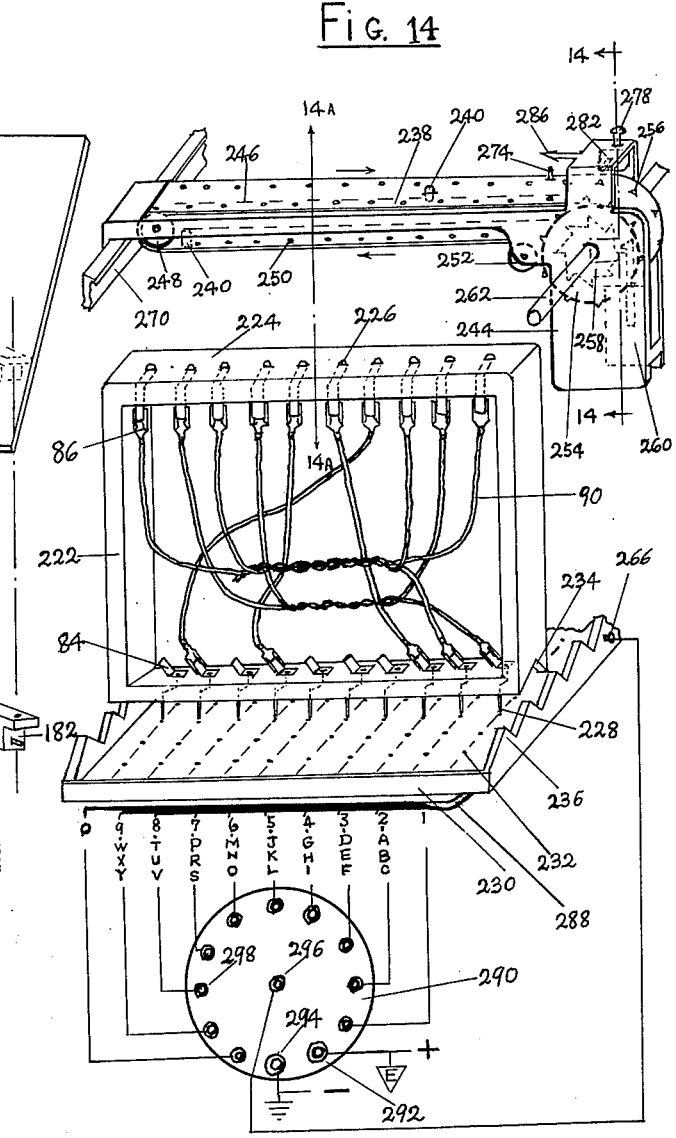
Fig. 14
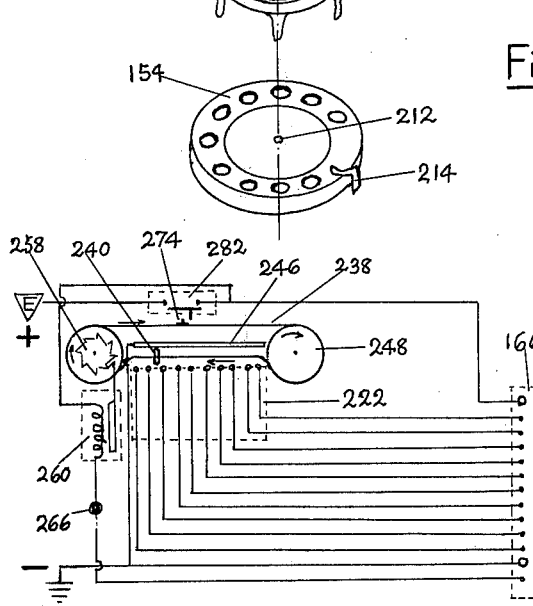
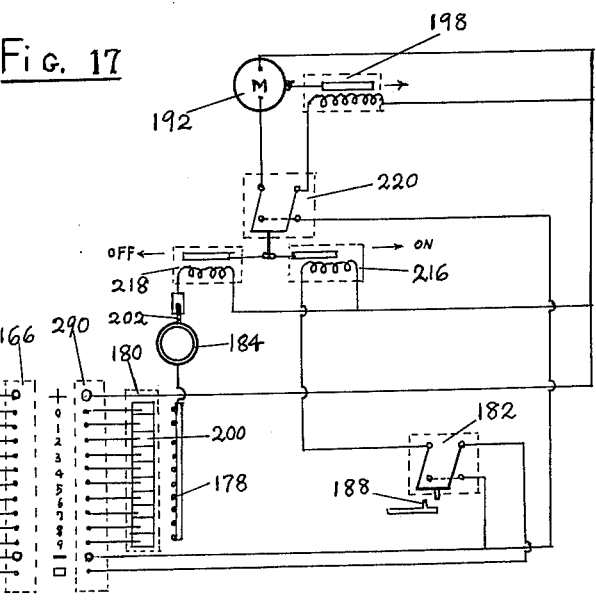
Fig. 17

AUTOMATIC TELEPHONE DIALER

BACKGROUND OF THE INVENTION

This invention relates to two types of automatic dialing apparatus, which can be mounted on any standard push button or rotary dial type telephone instrument of either desk or wall model, so as to automatically dial any desired telephone number of up to ten digits. The apparatus operates the telephone without touching or interfering with any of the telephone company's lines or circuits.

There presently exists numbers of automatic telephone dialers which are interwired with telephone company equipment. This installation procedures is both costly, time consuming, and can result in unnecessary additional telephone expenses. Further, these devises are not easily used by the ordinary household, although their application in that environment is important. Frequently, it is important both from a convenient standpoint as well as a situational standpoint that telephone numbers be automatically dialed. Thus, in cases of emergency, the person seeking to dial may panic, forgetting a telephone number to be dialed, and serious injury can result. In order to avoid such situations and also to provide a convenience factor, the automatic telephone dialer of this invention has been devised for easy assemblage, installation and usage, without interfering with standard telephone company equipment.

Results are conceivable that the control box which houses the index information for the respective telephone numbers could carry a Braille code so that blind people could use the present invention.

It is therefore a primary object of this invention to provide two types of automatic dialing apparatus, each of which can be easily used on any standard type telephone instrument without touching or interfering with the telephone company's lines and circuits or involving installation permission and extra expenses.

Another object of this invention is to provide an automatic dialing apparatus whereby a control box is provided with a plurality of easy exchangeable circuit modules therein, in which desired predetermined telephone number can be arranged.

Yet another object of this invention is to provide an inexpensive automatic dialing apparatus whereby the automatically set telephone numbers can be reprogrammed by merely pulling out one circuit module for rewiring and replacing with another one.

A still further object of this invention is to provide an automatic dialing apparatus whereby the speed of dialing wheel or a dialing belt is automatically synchronized by its dialing cycle. Therefore, the sequence of dialing is uniform and the recycle of dialing is done automatically after completion of each telephone call without interruption.

Still another object of this invention is to provide an automatic dialing apparatus whereby a dialing selector and a commanding push button is situated at a convenient spot on a control box, which can be easily reached and used even by the handicapped person.

Still another object of this invention is to provide an automatic dialing apparatus for either push type or rotary type dial telephones in which normal manual dialing can be employed if desired when the automatic dialing apparatus is not in use.

Still another important object of this invention is to provide an automatic dialing apparatus whereby a Braille index can be provided for a blind person to select a desired telephone number for automatic dialing.

Further objects advantages and features of this invention will become more apparent from the following description.

SUMMARY OF THE INVENTION

The invention of an automatic dialing apparatus for a push button type consists of a dialing platform which is provided with ten solenoid plungers mounted on any push button type telephone instrument, with each of solenoid plungers placed directly in contact with a corresponding push button key on the telephone instrument. Each plunger is marked with same number as on the push button key.

The automatic dialing apparatus is operated by a control box which consists of plurality of circuit modules. Each circuit module is provided with ten copper or brass contract points on a semi-circular face at the middle of its top frame and ten brass plug pins underneath its bottom frame. All circuit modules after being arranged with wiring or printed circuits are plugged in onto a prepared brass pin holed baseboard in parallel to form a single unit. A dialing wheel with a contact spring strip on its rim and shut-off peg on its edge mounted on a grooved shaft horizontally in the center of the circuit modules is rotated in alignment with the centerline of ten contact points on the semi-circular face of the circuit modules. The contact spring strip is firmly in touch with each contact point of the circuit module, while the dialing wheel is passing all contact points by means of an electric motor to actuate selected solenoid plungers one by one to push its corresponding key on the telephone instrument, in the proper sought after sequence.

After the contact spring strip of dialing wheel completes touching all ten contact points on the circuit module, a shut-off peg on the edge of the dialing wheel reaches the control switch and shuts off the entire electric circuit, which stops this dialing operation and enables the equipment to be ready for the next dialing.

A transparent plastic index plate is provided on top of the control box for alphabetically listing the name of parties frequently called. A Braille index may also be provided for sightless person.

The dialing function of a standard rotary dial type telephone instrument is actually performed, while the telephone dial is clicking and returning back to its original starting point after being released by the user, when the dialed number reaches the dial stopper on the telephone dial. The traveling distance and time of each dial number varies proportionally in accordance with value of the dial number. The lower the number the shorter the traveling distance and the larger the number, the longer the traveling distance. The number 0, representing the number 10, has the longest traveling distance.

The automatic apparatus designed for a dial type telephone instrument consists of a dialing platform with a dialing turn table, an electric motor, a dialing commander block, two relay switches and three solenoids. The dialing platform is mounted and supported by four adjustable brackets on a standard rotary, dial type telephone instrument, with its dialing turn table snapped onto the telephone dial by means of four adjustable rubber tipped adapting clips onto the dial hole.

The dialing platform can be lifted and swung out to the front of the telephone instrument by loosening butterfly screws on adjustable brackets for manual dialing, when the automatic dialing apparatus is not in use. On the face of the turn table there are ten short spring contacts, with each of them precisely fixed on each of the imaginary dialing tracks corresponding to the position of each dial hole on the telephone dial. All spring contacts are connected to an electric conducting ring at the center area of the turn table, and in turn, it connects to a shut-off solenoid through a copperized carbon brush at the end of the dialing commander block. A dialing commander block, with ten sectional copper contact points with their faces downward, is secured over the turn table at a position perpendicular to the dialing tracks also in alignment with the telephone dial stopper to serve as an electric dial stopper. Each sectional contact point on the dialing commander block is also in alignment with its corresponding dialing track on the turn table.

This automatic dialing apparatus is also operated by a control box which consists of a plurality of wired circuit modules of similar design as those used for the push button type telephone instrument, with the exception that (a) the top face of circuit module for the dial type is flat instead of semi-circular (b) a dialing belt with shell type contactors to touch the contact points on the circuit module one by one with stops in between instead of a dialing wheel with a contact spring strip on its rim to touch the contact points on the circuit module continuously without stopping, and (c) the dialing belt is driven by means of a solenoid and sprocket gear for moving the shell type contactor one step at a time instead of the dialing wheel driven by means of electric motor and gears at a constant speed.

When the control switch is pressed, the entire electric circuit is turned on, the motor pulling solenoid pulls the motor and its driving wheel to engage and drive the turn table together with the telephone dial clockwisely. Simultaneously, a sprocket pulling solenoid is also actuated, which pulls the sprocket driving wheel to move the shell type contactor on the dialing belt for one step forward in touch with the first contact point on the circuit module, which leads to a predetermined sectional contact point on the dialing commander block. As soon as one spring contact on the turn table passes under the dialing commander block and touches one predetermined sectional contact point, it instantly actuates a shut-off solenoid to pull of the motor switch and shuts off the electric current to both the electric motor and the motor pulling solenoid. Then, the electric motor immediately disengages from the turn table and swings back to its neutral position. This will allow the turn table to ride freely along with the telephone dial for clicking and returning back to its original starting point on the telephone dial shaft by its own spring tension power. It completes its dialing cycle.

Although, the other spring contactors may have passed under the commander block and touched the other sectional contact points before this one, but there will be no response, because only one sectional contact point is programmed to be activated by the circuit module for each dialing cycle to avoid mistakes. When the telephone dial reaches the original starting point, a dialing starting peg on the edge of the turn table hits a spring action relay, which actuates one solenoid to turn on the electric current for the electric motor to engage again and to drive the turn table together with telephone dial for performing the dialing operation and another solenoid to pull the sprocket driving wheel for moving the shell type contactor of the dialing belt from the first to the second contact point, which leads to another predetermined sectional contact point on the dialing commander block.

When the desired spring contactor on the turn table passes under the dialing commander block and touches the predetermined sectional contact point, it instantly actuates the shut-off solenoid, which disengages the electric motor from the turn table to allow the latter to ride freely along with telephone dial again for returning to its original point and, thus, completing its second dialing cycle. The same dialing operation is repeated until the completion of the dialing of the entire telephone number programmed by the circuit module. At the end of every ten succeeding dialing cycles, a small shut-off peg provided on the edge of the dialing belt reaches the control switch and shuts off the entire electric circuit of both the dialing platform and the control box to make the apparatus ready for next dialing operation.

BRIEF DESCRIPTION OF DRAWINGS

FIG. 6 is fragmentary partial view of the driving shaft of this invention;

FIG. 7 is a partial perspective view of a control portion of the automatic dialing apparatus operative at a particular module location;

FIG. 8 is a sectional view along the lines of 8—8 of FIG. 7;

FIG. 9 is a perspective view of a push button telephone and a control box operating therewith;

FIG. 10 is a perspective view of another embodiment of my invention for use with a rotary dial type telephone mounted on such a telephone;

FIG. 11 is a sectional view through the telephone of FIG. 10 and through the elements of my invention mounted thereon;

FIG. 12 is a partial schematic view of the rotary dial portion of standard telephone with my invention mounted thereon connected to a plug member therefore;

FIG. 13 is an exploded view of the portions of the elements of my invention to be mounted on a standard rotary typed out telephone;

FIG. 14 is a perspective view of a module for use with this latter embodiment of my invention;

FIG. 15 is a fragmentary side view of the dialing belt assembly;

FIG. 16 is a partial cross-sectional view of the dialing belt assembly used in my invention; and FIG. 17 is an electrical schematic diagram illustrating the operation of my invention.

DETAILED DESCRIPTION

Figure 1:
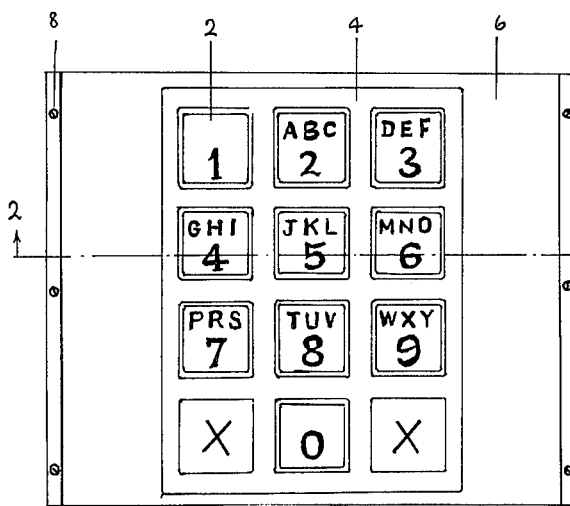
FIG. 1 is a partial top view of the automatic dialing platform mounted upon a conventional push button telephone.

Referring to the drawings, and in particular to FIG. 9, there is shown an embodiment of my invention in which a conventional pushbutton standard telephone 28 is illustrated connected to a control box 142 by means of a cable 10. The control box 142 comprises an elongated rectangular housing having independent and individual operable modules 76 which are used for the automatic dialing of this invention. The control box and its components will be described later. The control box and its modules enable a series of preset telephone numbers to be formed so that control signals in proper sequences are developed in order to enable the pushbutton phone to dial the desired telephone number.

Figure 2:
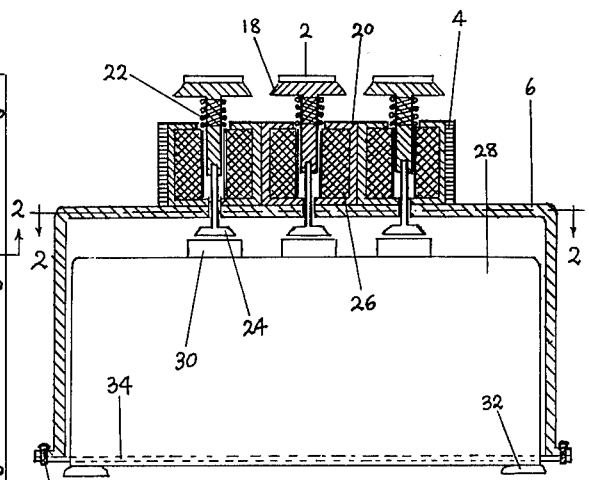
FIG. 2 is a sectional view along the lines 2—2 of FIG. 1 illustrating the dialing platform of this invention.

As shown in FIGS. 1 and 2, an automatic dialing platform 6 for the pushbutton type telephone consists of a casing 4 with ten solenoid bodies 20 made of a soft iron core and is mounted on top of a standard pushbutton type telephone instrument 28 and is secured on a base plate 34 by adjusting screws 8. Each solenoid body is provided with a pushbutton 2 provided with a telephone dial number, a center piece 18 made of iron core, a tension spring 22 wound thereabout, an electric coil 26 and a plastic plunger 24, in touch with a corresponding pushbutton key 30 of the telephone instrument 28.

A cable 10 is provided with eleven different color wires with one red color wire connecting to one terminal of all ten electric coils 26 for positive electric current. Each of the ten remaining color wires is connected to one of the ten other terminals of electric coil 26. The other end of cable 10 is joined to an eleven prong plug 12, with its red color wire connected to a large prong 14 for the positive electric source, and each of the remaining ten different color wires is connected to ten small prongs 16.

As shown in FIGS. 3, 4, 5 & 7 a dialing selector assembly 36 with a selector control plate 38, a control button 40, and a selector pointer 42 on one end, rests on a position lock rail 46, on which it travels along the side of a plastic index plate 44. The other end 50 rests on a sliding rail 48. A dialing wheel 58 with guarding plates 60 on both sides, an electric conducting strip 70 connecting to a spring contactor 72 on dialing wheel rim, a shut-off peg 74 and a wheel bushing 62 is mounted and movable on a driving shaft 66 and guard by two teeth 64 on the wheel bushing and grooves 68 on the driving shaft to prevent the dialing wheel from turning independently on the shaft. A pair of fork yoke brackets 56 is provided on the middle section of the selector assembly 36 for holding and moving the dialing wheel 58 horizontally along driving shaft 66 when the selector assembly moves together with the control plate. A control switch 52 is also provided at the middle section of selector assembly with its switch pole 140 stretched out just above the edge of the dialing wheel, and thus will enable its shut-off peg 74 to reach the control switch 52 for shutting off electric current when spring contactor 72 on the dialing wheel completes its dialing cycle.

Under the selector assembly 36, there are a plurality of plastic circuit modules 76, each of which is provided with ten copper or brass contact points 88 on a semicircular face at its top center, with ten male connecting lugs 84 underneath respective ones of each contact point. The bottom of each circuit module 76 is provided with ten brass plug pins 82 attached with male connecting lugs on top of each brass pin terminal. A baseboard 94 is provided with ten rows of brass pin holes 96, with each row of brass pin holes connected in series and designated with a telephone number from 1 to 0, whereon a group of wired circuit modules are plugged in, in parallel and fitted side by side to each other by module alignment joints 80, to form as single unit under the dialing wheel 58 and selector assembly 36 in the control box 142.

A cable 98 with eleven different color wires the same as cable 10, with one red color wire connected to a positive terminal of electric source and the remaining ten wires of a different color are connected one to each terminal of ten rows of brass pin holes. The other end of cable 98 is connected to an eleven prong joint socket 100. The red color wire connects to a large prong receptacle 102 for a positive electric source. Each of ten remaining wires of different color are connected to a small prong receptacle 104 in correspondence to a small prong 16 of eleven prong plug 12, in same sequence and manner. Thus, the ten solenoid coils on the dialing platform are correctly connected to the terminal of the ten rows of brass pin holes on the baseboard in exactly the same sequence of telephone digit number from 1 to 0.

Figure 3:
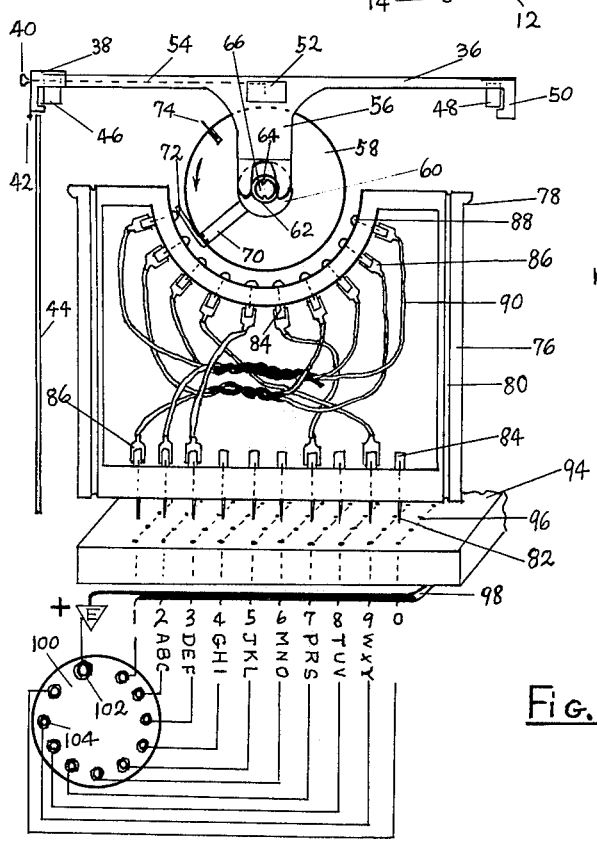
FIG. 3 is a schematic view of one circuit module used in the present invention.

Referring particularly to FIG. 3, there is shown a fragmentory view of a circuit module 76 which has been wired with a telephone number for dialing the New York City weather information 212 WE7-1212 or 212 937-1212 in the following procedure: The first step is to use three connecting wires 90 with female connecting lugs 86, twisted together with their middle section insulation 92 being removed. It becomes a six terminal connecting wire with a female connecting lug 86 on each end, which then slides on the female connecting lug of one terminal to the male connecting lug of a second brass pin terminal which, ultimately connects to the No. 2 solenoid on the dialing platform. The remaining five terminals are slid onto the male connecting lugs of the first, third, eighth and tenth contact points on the circuit module 76 after shearing off the last terminal. The second step is to prepare two connecting wires in the same manner. It becomes a four terminal wire with a female connecting lug on each terminal. One terminal with a female connecting lug is connected to the male lug of a first brass pin, which ultimately connects to the No. 1 solenoid on the dialing platform. Likewise, the three remaining terminals are connected to the male connecting lug of the second, seventh and ninth contact points. The third step is to use one connecting wire, with one end connecting to the third brass pin, which leads to the No. 3 solenoid and the other end which connects to the fifth contact point. The fourth step is to use one connecting wire, with one end connecting to the seventh brass pin which leads to the No. 7 solenoid and the other end connecting to the sixth contact point. Finally, one more connecting wire is used, with one end connecting to the ninth brass pin which leads to No. 9 solenoid, and the other end connecting to the fourth contact point. Since the numbers 4,5,6,8 and 0 are not used, the fourth, fifth, sixth, eighth and tenth brass pins are not connected. Thus completes the wiring for the automatic dialing of 212 937-1212.

When control button 40 is depressed, it presses push rod 54 to reach control switch 52 and an electric motor 128 is actuated to drive dialing wheel 58 by means of worm gear 130, first reduction gear 134, first reduction pinion gear 136, second reduction gear 116 and driving shaft 66 at a constant speed of about 10 RPM or 6 seconds per revolution. The spring contactor 72 on the dialing wheel 58 is grounded to a negative electric source through electric conducting strip 70, guarding plate 60, wheel bushing 62 and driving shaft 66. When the spring contactor touches the first contact point on the circuit module, it instantly actuates the No. 2 solenoid to push No. 2 push button key of telephone instrument. When the spring contactor touches the second contact point of circuit module, it actuates No. 1 solenoid to push No. 1 push button key. When the spring contactor touches the third contact point, it actuates No. 2 solenoid again to push No. 2 push button key. As the spring contactor goes on to touch the fourth contact point of circuit module, it actuates No. 9 solenoid to push No. 9 push button key of the telephone instrument. When the spring contactor touches the fifth contact point, it actuates No. 3 solenoid to push No. 3 push button key. When the spring contactor touches the sixth contact point it actuates No. 7 solenoid to push No. 7 push button key. When the spring contactor touches the seventh contact point, it actuates No. 1 solenoid again, it pushes the No. 1 push button key. When the spring contactor touches the eighth contact point, it actuates No. 2 solenoid a third time and it pushes No. 2 push button key. When the spring contactor touches the ninth contact point, it actuates No. 1 solenoid a third time and it pushes No. 1 push button key. When the spring contactor 72 touches the tenth contact point, it actuates No. 2 solenoid a fourth time and it pushes No. 2 push button key. This completes the automatic dialing of ten digits telephone number of the New York City weather information 212 937-1212.

Figure 4:
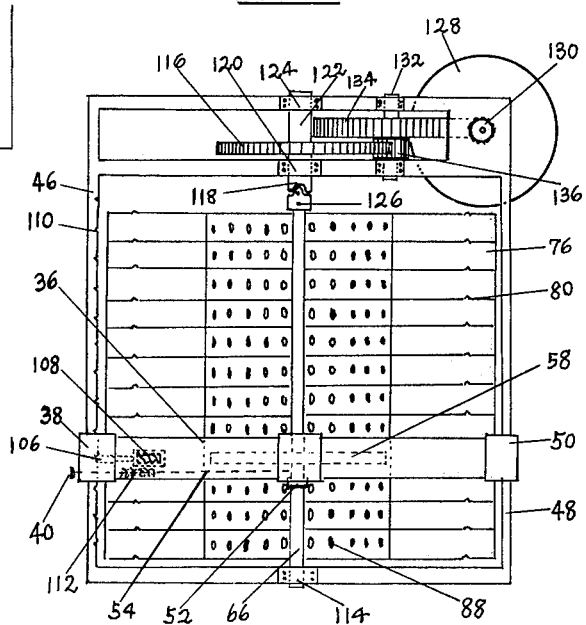
FIG. 4 is a side view of a control box used to house a plurality of modules for accomplishing the automatic dialing function.

Referring to FIGS. 4, 6, 7 and 8 and particularly to FIGS. 4 and 6, there are shown a fragmentary view of driving shaft 66 with its one end half tapered at 138 and is fitted into a hollow universal joint shaft 118 of a second reduction gear 116 and is secured by a setting screw 126, with its other end secured by a shaft bushing holder 114. This facilitates the removal of dialing wheel 58 from the unit by lifting out the selector assembly 36 from position lock rail 46 and sliding rail 48 and unscrewing of setting screw 124 to remove bushing holder 114 for changing circuit modules. There is shown a shut-off peg 74 on the rim of the dialing wheel 58 which will reach the switch pole 140 of control switch 52 to shut off the entire electric circuit, as soon as the spring contactor 72 completes its dialing of ten digit telephone number. There is also shown one longitudinal groove 68 on each side of driving shaft 66, which is provided for guarding teeth 64 of the wheel bushing to fit into and to hold the dialing wheel 58 firmly in position and also to prevent it from rotating itself independently from the shaft, while its spring contactor is in motion of sweeping across the center line of ten contact points 88 of a designated circuit module 76.

As shown in FIG. 9 there is shown a perspective view of a dialing platform 6 mounted on a standard push button type telephone instrument 28. A control box 142 containing the selector assembly 36, circuit module 76, electric motor, gears, dialing wheel and other components as illustrated in preceding paragraph is covered with a plastic index plate 44 which can also be made with braille index for a blind person, if desired. For purposes of changing or reprogramming of circuit modules, it requires the opening of the side cover 144 by removal of the screw 146. The dialing platform 6 and control box 142 are connected by the eleven wire cable 10, eleven prong plug 12, and eleven prong receptacle socket 100 with the cable 98 in the control box which is not shown.

Figure 5:
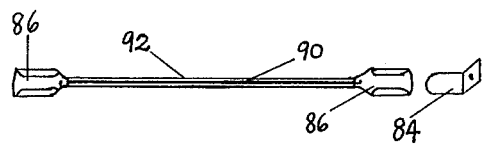
FIGS. 5 and 5a are perspective views of different electrical connectors used in the wiring of the modules of FIG. 3.
Figure 5A:
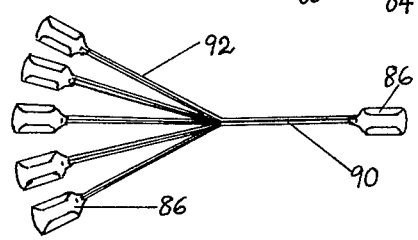

With reference to FIG. 5a, there is shown an alternative embodiment for the electrical connector in which a single female lug is shown connected on one end while a plurality of female lugs is shown connected at the other end to simplify the interconnection procedure in FIG. 3 of the assembly work of the module. As understood, the module can be prewired or arranged outside the machine prior to being inserted in order to automatically arrange for the sequence in numbers to be automatically dialed by my invention.

As can be appreciated, the present invention is capable of being mounted on the standard push button type telephone without interfering with the normal telephone operation. Thus, when the automatic dialing feature is not required, the person merely manually depresses the desired push buttons in the ordinary sequence as he normally would and the desired telephone number is dialed. When it is desired to operate the automatic teleophone dialing apparatus, the person merely does that without making any adjustments, so that the operation of the standard telephone is in no way disturbed or modified. Further, the present invention can be installed without resort to changing telephone equipment or wiring, which is a disadvantage of present apparatus.

Referring to FIGS. 10 through 17, and particularly to FIG. 10, there is shown a perspective view of another type of automatic dialing platform 150 with its cover 152 mounted on a standard dial type telephone instrument 148 by four sets of adjustable brackets 158 from supporting base 162 and secured with butterfly screws 160 which will enable the automatic dialing platform 150 to be lifted up and to be swung out to the front of the telephone instrument for manual dialing when automatic dialing is not in use. A thirteen different color wire cable 164 and thirteen prong plug 166 are provided for the dialing platform to connect to the control box which is to be illustrated later.

As shown in FIGS. 11, 12 and 13 a dialing turntable 176 with bushing 186 in the center, gear teeth or friction rubber face on its rim and its base 204 attached underneath by screws 206 is mounted on a vertical short shaft 196 under the dialing platform 150. Under the turntable base there are four pieces of rubber tipped dial adapting clips 208 secured to the turntable base by clip adjusting screws 210. The turntable can be snapped on to any rotary dial type telephone instrument of either desk or wall model. On the face of turntable 176, eleven equal width imaginary dial tracks are designated. Each dial track has one short spring contactor 178 at a position a little ahead of each dial hole of telephone dial 154 in telephone dial sequence 1,2,3,4,5,6,7,8,9, and 0. All spring contactors 178 are connected to an electric conducting ring 184 with its face even with the turntable face. A dial starting peg 188 is fitted on the edge of the turntable at a position just beyond the last dial hole No. 0, which will start each dialing operation at the end of each preceding dialing cycle as soon as the starting peg hits a spring action relay 182. A dialing commander block 180 with ten sectional contact points 200, with their faces downward and one copperized carbon brush 202 is provided under the dialing platform 150 and secured at a position just high enough over the turntable for its short spring contactors 178 to reach. The dialing commander block is also in alignment with dial stopper 214 to serve as an electric dial stopper. The dialing commander is also perpendicular to the imaginary dial tracks which will assure that the sectional contact points 200 are in alignment with its corresponding spring contactors 178 on the turntable. A copperized carbon brush 202 is constantly in touch with the electric conducting ring 184, which is connected to the shut-off solenoid 218.

At the beginning of the dialing operation, the motor switch 220 is actuated by a switch-on solenoid 216, then the motor pulling solenoid 198 pulls the electric motor 192 with its driving wheel 190 and spring swing bracket 194 to engage and drive the turntable 176 together with telephone dial 154 clockwisely. When the spring contactor 178 on the turntable passes under dialing commander block 180 and touches one of its sectional contact points being predetermined by a circuit module, it instantly actuates the shut-off solenoid 218 to shut off the motor switch 220, which immediately stops the function of both the electric motor and motor pulling solenoid and also causes the electric motor and its driving wheel to disengage from the turntable and swing back to their neutral position by the spring swing bracket 194. This will release and allow the turntable riding freely along with the telephone dial 154 on the telephone dial shaft 212, while the latter is clicking and returning back to its original starting point by its own spring tension power.

As illustrated in the preceding paragraph, a dial starting peg 188 on the edge of turntable will hit the spring action relay 182 to actuate the motor switch 220 by the switch-on solenoid 216 at the end of each dialing operation. Simultaneously, the spring action relay also actuates the sprocket pulling solenoid 260 to pull the sprocket driving wheel 254 to move the shell type contactor 240 of dialing belt 238 from the first to the second contact point, which leads to one of the sectional contact points on the dialing commander block. This will start the second dialing operation, as the motor and its driving wheel is engaged and again drives the turntable together with the telephone dial clockwisely, in the same manner as the first dialing operation. When one of the spring contactors on the turntable passes under the dialing commander block and touches one of the sectional contact points predetermined for the second dialing number by the circuit module, it will instantly actuate the shut-off solenoid to shut off the motor switch which disengages the electric motor from the turntable. This allows the turntable, riding with the telephone dial, to click and return to its original starting point. This completes the second dialing operation. The same dialing operation is repeated continuously until a shut-off peg 274 on the dialing belt 238 reaches main control switch 282 on the dialing belt assembly 244 to shut off the entire electric circuit after completing of dialing the entire telephone number as reset. During the dialing operation, the other spring contactors 178 on the turntable may have also passed under the dialing commander block 180 and touched other sectional contact points 200 before a predetermined one but with no response, because there is only one predetermined sectional contact point programmed on the circuit module for each dialing to avoid mistakes.

Connecting cable 164 consists of thirteen different color wires and is connected to the dialing commander block 180. At one end of the cable, one black color wire is connected to the grounding or negative electric terminal, one red color wire is connected to a positive electric terminal and one white color wire is connected to one terminal of spring action relay 182, which leads to a sprocket pulling solenoid 260 on the dialing belt assembly 244. Each of the remaining ten different color wires is connected to one of ten sectional contact points 200 in the same sequence of the telephone dial, numbered from 1 to 0, in a direction from the edge to the center of the turntable. The other end of cable 164 is connected to a thirteen prong plug 166, one black wire is connected to a large prong 170 for negative electric source, one red color wire is connected to another large prong 168 for positive electric source and one white color wire is connected to center prong 172 leading to the sprocket pulling solenoid 260 mounted on dialing belt assembly 244. Each of the remaining ten different color wires is connected to one of ten small prongs 174 in the same sequence as the sectional contact point 200.

The control box for the dial type dialing platform is similar to one illustrated for push button type dialing platform, as shown in FIG. 10. It houses all mechanical and electric components of dialing control mechanism of my invention, therefore, it needs no further elaboration. Referring to FIGS. 14, 15, 16 and 17, and in particular to FIGS. 14 and 15, there are shown, schematic fragmentary side views and cross sectional views of the dialing belt assembly, circuit module and baseboard and control section of the dialing belt assembly, respectively. An automatic dialing belt 238 with small sprocket holes 250 is mounted on a dialing belt assembly 244, which is moved by a sprocket driving wheel 254 and end wheel 248. The dialing belt 238 is also supported at its lower half by a small idle wheel 252 near the sprocket driving wheel. The sprocket driving wheel with its small sprocket gear 258 is mounted and travels on a railing shaft 262 at one end of the dialing belt assembly, the end wheel 248 is mounted on the other end of a dialing belt assembly and travels on a sliding rail 270. The underside of railing shaft 262 is provided with numerous equal distance shallow position notches 264 for locking wedge 268 on the bottom end of selector control bar 272 to lock in position by a pushing upward spring 276, after selector pointer 286 had pointed to a desired name on the index plate. The locking wedge 268 can only be released from locking notch 264 by pressing down selector control bar 272 to overcome the tension spring 276 while moving the dialing belt assembly 244 freely along the railing shaft 262 for selection of a new name on the index plate.

The sprocket driving wheel 254 with its sprocket gear 258 is pulled by a small solenoid 260 mounted on the dialing belt assembly. The sprocket gear 258 is operated by a spring action relay 182 on the dialing platform 150. However, it only moves the shell type contactor 246 of the dialing belt at exactly the same distance between two contact points 226 on the circuit module. This will give a certain time interval for each dialing operation. In other words, the lower the digit number the shorter the travelling distance and therefore the less time for telephone dial 154 to click and return back to its original starting point. The higher the number, the longer the travelling distance and more time for the telephone dial to return to its starting point.

On the center line of dialing belt 238 there are a plurality of equal distance, consecutively situated pieces of double end copper or brass shell type contactors 240, each with a small tension spring 242 in it. Each is riveted through the dialing belt with its lower end touching contact point 226 on the top frame of circuit module and its upper end sliding on the grounding plate 246. The grounding plate is mounted between the dialing belt 238, but is closer to the dialing belt of its lower travelling position. This is to assure a firm contact of shell type contactor 240 to touch contact point 226 only by its lower end and the grounding plate 246 by its upper end as the dialing belt 238 is moving horizontally along the top frame 224 of the circuit module. However, after passing the last contact points of the circuit module, both ends of any shell type contactors are freed and touch nothing while travelling along the upper helf of dialing belt. On one edge of the dialing belt, the edge closer to the control switch, there are a plurality of consecutively situated shut-off pegs 274 for releasing lock spring 284 of the control switch 282 to shut off the entire electric circuit after each completion of ten succeeding dialing operations. The distance between the shut-off pegs is exactly the same as the distance between the shell type contactors.

Under the dialing belt assembly 244, there are a number of plastic circuit modules 222, similar to those used for the push button type dialing platform of the first embodiment. Each of them is provided with ten copper or brass contact points 226 on its top frame 224, with ten male connecting lug 84 fitted on each terminal of ten contact points underneath the top frame. The bottom of each circuit module is provided with ten brass plug pins 228 also attached with male connecting lug 84 on each terminal of ten brass pins on top of the bottom frame. A baseboard 230 is provided with a sprocket pulling solenoid connecting terminal 266 on its side and ten rows of brass pin holes 232, with each row of brass pin holes connected in series and designated with a telephone digit number from 1 to 0.

A group of programmed circuit modules 222 is plugged in on these ten rows of brass pin holed baseboard, side by side in parallel and aligned to each other by the alignment notch 234 on both ends of the bottom frame of each circuit module and alignment mark points 236 on both sides of the baseboard, to form a perfect single unit under the dialing belt assembly 244 for smooth dialing operation.

A cable 288 with thirteen different color wires is provided for the baseboard to join to the dialing platform. This cable is similarly connected as cable 164 used on the dialing platform, with one black color wire connecting to a grounded negative electric source, one red color wire connecting to a positive electric source and one white color wire connecting to the sprocket pulling solenoid terminal 266 on the side of the baseboard 230. Each of the ten remaining different color wires is connected to one of each terminal of ten rows of brass pin holes 232 in the same sequence as the telephone dial number from 1 to 0. At the other end, cable 288 is connected to a thirteen prong receptacle socket 290, one black color wire connecting to one large prong receptacle 294 for the negative electric terminal, one red color wire connecting to another large prong receptacle 292 for the positive electric terminal and one white color wire connecting to the center prong receptacle 296. Each of the ten remaining differently color wires is connected to a small prong receptacle 298 in correspondence to the small prong 174 of the thirteen prong plug 166 in the same sequence and manner. This assures that the ten sectional contact points 200 on the dialing commander block 180 are precisely connected to the terminal of ten rows of brass pin holes 232 on the baseboard 230 in exactly the same sequence as the telephone dial digit numbers from 1 to 0.

Referring to FIG. 14 again, there is shown a fragmentary view of a circuit module 222, which has been wired with a telephone number (212) 937-1212 for dialing the New York City weather information in exactly the same procedure and manner as the one illustrated above for push button type telephone, as shown in FIG. 3.

When the control push button 278 of this unit is depressed and locked onto the control switch 282 by a lock spring 284, the entire electric circuit is turned on. Both the motor switch 220 on the dialing platform and sprocket pulling solenoid 260 in the control box are actuated. Then the motor pulling solenoid 198 pulls the electric motor 192 with its driving wheel 190 and spring swing bracket 194 to engage and drive the turntable 176 together with telephone dial 154 clockwisely. Simultaneously, the sprocket pulling solenoid 260 pulls the sprocket gear 258 and driving wheel 254 to move the shell type contactor 240 of dialing belt 238 to touch the first contact point on the circuit module. As shown in FIG. 14, the first contact point is connected to the second brass pin which leads to the No. 2 sectional contact point on the dialing commander block.

There is no response when No. 1 spring contactor 178 on the turntable 176 passes under the dialing commander block and touches the No. 1 sectional contact point because only the No. 2 sectional point on the dialing commander was predetermined. However, when the No. 2 spring contactor passes under the dialing commander block and touches the predetermined No. 2 sectional contact point, it instantly actuates the shut-off solenoid 218 to shut off the motor switch 220 and automatically stops the function of both the electric motor and the motor pulling solenoid, causing the electric motor and its driving wheel to disengage from the turntable and swing back to its neutral position by the spring swing bracket 194. This will release and allow the turntable to ride freely along with the telephone dial 154 on the telephone dial shaft 212, as the latter is clicking and returning to its original starting point. This completes the first dialing cycle for the number 2.

As illustrated previously, when the dialing starting peg 188 on the edge of the turntable hits the spring action relay 182 at the end of the dialing cycle, it actuates both the motor switch 220 and sprocket pulling solenoid 260. The electric motor with its driving wheel engages and drives the turntable together with the telephone dial again clockwisely. Simultaneously the sprocket pulling solenoid pulls the sprocket driving wheel to move the shell type contactor of the dialing belt from the first to the second contact point on the circuit module. The second contact point is connected to the first brass pin, which leads to the No. 1 sectional contact point on the dialing commander block, as shown in FIG. 14.

When the No. 1 spring contact on the turntable passes under the dialing commander block and touches the predetermined No. 1 sectional contact point, it instantly actuates the shut-off solenoid to shut off the motor switch sooner than the first dialing, because of shorter travelling distance and less time for No. 1 dial hole to reach the dial stopper as illustrated previously. Likewise, the electric motor and its driving wheel disengage themselves from the turntable and swing back to its neutral position, allowing the turntable to ride freely with the dial returning back to its starting point. This completes the second dialing cycle for the number 1.

At the end of the second dialing cycle, the dialing starting peg hits the spring action relay as usual, and actuates both the motor switch and the sprocket pulling solenoid. The electric motor with its driving wheel engages and drives the turntable together with the telephone dial clockwisely. Simultaneously, this sprocket pulling solenoid pulls the sprocket driving wheel to move the shell type contactor of the dialing belt from the second to the third contact point on the circuit module. The third contact point is connected to the second brass pin, which leads to the No. 2 sectional contact point on the dialing commander block the same as the first contact point. There is also a lack of response when the No. 1 spring contactor of the turntable passes under the dialing commander block and touches the No. sectional contact point as illustrated in the first dialing operation. As soon as the No. 2 spring contactor passes under the dialing commander block and touches the predetermined No. 2 sectional contact point, it instantly functions in exactly the same manner as the first dialing cycle and completes the third dialing for the number 2.

At the end of the third dialing cycle, the dialing starting peg hits the spring action relay as usual and actuates the electric motor to engage and drive the turntable together with the telephone dial clockwisely, in exactly the same manner as the preceding dialing operation. Likewise, the sprocket pulling solenoid simultaneously actuates the sprocket driving wheel to move the shell type contactor from the third to the fourth contact point on the circuit module. As shown in FIG. 14, the fourth contact point is connected to the ninth brass pin, which leads to the No. sectional contact point on the dialing commander block. There is no response, as the No. 1,2,3,4,5,6, 7, and 8 spring contactors on the turntable pass under the dialing commander block and touch its corresponding sectional contact point. However, when the No. 9 spring contactor passes under the dialing commander block and touches the predetermined No. 9 sectional contact point, it instantly actuates the shut-off solenoid to shut off the motor switch and automatically stops the function of both the electric motor and the motor pulling solenoid, causing the electric motor with its driving wheel to disengage from the turntable. The electric motor then swings back to its neutral position by the spring swing bracket. This allows the turntable to ride freely along with the telephone dial on the telephone dial shaft to return back to its original starting point. This operation requires a little more time than all preceding dialing operations due to the fact that it takes the No. 9 dial hole longer time to reach the telephone dial stopper and return back to the starting point, as illustrated previously. This completes the fourth dialing cycle for the number 9.

The dialing operation for the remaining six telephone digits 37-1212 is performed in exactly the same manner as the four preceding dialing cycles, with the exception of the tenth or the last dialing operation, which is a little different at the end of the dialing cycle. As the dialing starting peg 188 on the edge of the turntable 176 hits the spring action relay 182, it actuates both the switch-on solenoid 216 and the sprocket pulling solenoid 260. When the motor switch 220 is turned on by the switch-on solenoid 216, the electric current on the dialing platform is turned on and the motor pulling solenoid 198 pulls the electric motor 192 with its driving wheel 190 and spring swing bracket 194 to engage and drive the turntable 176 together with the telephone dial 154. The sprocket pulling solenoid 260 pulls the sprocket driving wheel 254 to move the shell type contactor 240 and the dialing belt 238 from the tenth contact point to the void space and leaves the circuit module, as another shell type contactor on the dialing belt moves in and touches the first contact point on the circuit module. Simultaneously, the first shut-off peg 274 on the edge of the dialing belt 238, reaches and releases the lock spring 284, allowing the control button 278 of the control switch 282 to pop up to its shut-off position by the force of the tension spring 280.

After the completion of the succeeding dialing cycles, the entire electric circuit for both the dialing platform and the control box are turned off. At the time of turn off of the entire electric circuit, both the motor switch on the dialing platform is already turned on and the another shell type contactor on the dialing belt is already moved in and touches the first contact point on the circuit module, which leads to one predetermined sectional contact point on the dialing commander block, so that they are always in a ready position for the next dialing operation, as soon as the control button is depressed to turn on the entire electric circuit.

It will thus be seen that the object set forth above above among these made apparent from the preceding description are efficiently attained and since certain changes made in the above invention without departing from the scope thereof, is intended that all matter contained in the above description and shown in the accompanying drawing shall be interpreted as illustrative and not in a limiting sense.

I claim:

1. An automatic telephone dialing apparatus for use with a conventional telephone to be mounted thereon, said apparatus comprising a control box for generating a series of electrical signals for accomplishing said automatic dialing, automatic dialing means mounted on said telephone, cable means connected between said automatic dialing means and said control box, said control box comprising a plurality of storage means, a plurality of programmable modules storing respective telephone numbers to be dialed, said storage means accommodating said modules, each of said modules being manually adjusted to set the telephone number to be automatically dialed, said control box further comprising a dialing wheel and a contact mounted and carried thereon in a circular path, each of said storage means comprising a circular support, said circular support being concentric with said dialing wheel, a plurality of contacts attached to said circular support, each of said modules comprising means to connect each of said plurality of contacts mounted on said circular support to a respective selected dial command signal for generating a series of electrical signals, said plurality of contacts being adapted to be touched by said contact on said dialing wheel, such that said series of electrical signals are generated to accomplish said automatic dialing.

2. An automatic telephone dialing apparatus as in claim 1, wherein said dialing means comprising a plurality of solenoid actuated plungers, a plurality of push buttons with each of said push buttons attached to respective one of said solenoids, said conventional telephone being a push button telephone, said dialing means being attached to said push button telephone with respective ones of said solenoid actuated plungers being located above and in alignment with respective ones of the push button in said conventional telephone, such that said conventional telephone can be manually operated by pushing on said push buttons of said dialing means and can be automatically operated by selectively actuating ones of said solenoids.

3. An automatic telephone dialing apparatus as set forth in claim 2, further comprising motor means to move said dialling wheel in a continuous motion to generate said series of electrical signals, a baseboard comprising a plurality of sets of electrically conducting pins, each of said set of pins corresponding to a respective one of said modules, said cable carrying said series of electrical signals directly to said solenoids to automatically sequentially operate selected ones of said solenoids to perform said automatic dialing.

4. An automatic telephone dialing apparatus as in claim 1, wherein said control box comprises an index plate and a index pointer, said index pointer moving to selected positions in said control box to actuate selected modules to generate said unique set of electrical signals.

5. An automatic dialing apparatus as in claim 1, comprising a shaft extending the length of said control box, said shaft carrying said dialing wheel, said dialing wheel being movable along said shaft to operate with selected ones of said circuit modules, said shaft being movable out from said control box to permit said circuit modules to be replaced.

6. An automatic telephone dialing apparatus as in claim 1, wherein said telephone is a rotary dial telephone, said dialing means comprising a turntable mounting on and rotating with said rotary dial, said turntable comprising a plurality of concentric dialing tracks with each of said tracks corresponding to a different sequential number in a telephone number to be dialed, a helical electrical conducting ring mounted on said ring containing a plurality of electrical contacts corresponding to said tracks, said turntable and rotatable therewith, a dialing commander block mounted across said turntable and comprising a plurality of actuatable contacts adapted to contact the plurality of said contacts on said ring for selectively stopping the rotation of said turntable at specific points to allow said turntable to return to a start position and means for measuring the amount of return travel of said turntable to automatically dial a specific telephone number in accordance with the selected contacts of said actuable contacts of said commander block.

7. An automatic telephone dialing apparatus as in claim 6, wherein said dial commander block is located approximately at the manual dial stopper of said conventional rotary dial telephone, said turntable being turned by an electric motor, said electric motor terminating its turning function automatically to enable said turntable to return a selected amount to said start position.

8. An automatic telephone dialing apparatus as in claim 7, comprising means to connect the series of electrical signals generated by the control box to said commander block for performing said automatic dialing of a telephone number.

* * * * *